United States Patent
Yang

(10) Patent No.: US 9,615,240 B2
(45) Date of Patent: Apr. 4, 2017

(54) ACCESSIBILITY MANAGEMENT METHOD AND DEVICE FOR M2M TERMINAL/TERMINAL PERIPHERAL

(71) Applicant: ZTE CORPORATION, Shenzhen, Guangdong Province (CN)

(72) Inventor: Kun Yang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 15/104,241

(22) PCT Filed: Apr. 23, 2014

(86) PCT No.: PCT/CN2014/076036
§ 371 (c)(1),
(2) Date: Jun. 30, 2016

(87) PCT Pub. No.: WO2015/089969
PCT Pub. Date: Jun. 25, 2015

(65) Prior Publication Data
US 2016/0309317 A1    Oct. 20, 2016

(30) Foreign Application Priority Data

Dec. 16, 2013 (CN) .......................... 2013 1 0693194

(51) Int. Cl.
*H04W 4/00* (2009.01)
*H04W 8/06* (2009.01)
(Continued)

(52) U.S. Cl.
CPC ............. *H04W 8/06* (2013.01); *H04W 4/005* (2013.01); *H04W 8/08* (2013.01); *H04W 8/12* (2013.01); *H04W 60/06* (2013.01)

(58) Field of Classification Search
None
See application file for complete search history.

(56) References Cited

U.S. PATENT DOCUMENTS

2008/0320149 A1    12/2008    Faccin
2012/0252518 A1    10/2012    Karampatsis et al.
(Continued)

FOREIGN PATENT DOCUMENTS

CN    101500290 A    8/2009
CN    102045897 A    5/2011
(Continued)

OTHER PUBLICATIONS

3GPP TR 23.88;3rd Generation Partnership Project; Technical Specification Group Services and System Aspects; System Improvements for Machine-Type Communications; (Release 10).

*Primary Examiner* — Suhail Khan
(74) *Attorney, Agent, or Firm* — Ling Wu; Stephen Yang; Ling and Yang Intellectual Property

(57) ABSTRACT

A reachability management method and device for a machine-to-machine/man (M2M) terminal/terminal peripheral are provided in the embodiments of the present document, which relates to machine-to-machine/man communications. The reachability management method for the M2M terminal/terminal peripheral provided in the present document includes the following steps: when selecting to switch to an M2M stub network, the M2M terminal/terminal peripheral sending a detach request message to a corresponding network side device, wherein the detach request message comprises a terminal signalling connection retention indication; and meanwhile, the M2M terminal/terminal peripheral sending a registration request message to an M2M gateway, wherein the registration request message contains an identifier of the network side device. A terminal, a network side device and an M2M gateway device are also provided in the embodiments of the present document.

14 Claims, 1 Drawing Sheet

(51) Int. Cl.
*H04W 8/08* (2009.01)
*H04W 8/12* (2009.01)
*H04W 60/06* (2009.01)

(56) References Cited

U.S. PATENT DOCUMENTS

2013/0122905 A1\* 5/2013 Casati ............... H04W 60/06
 455/435.1
2013/0329653 A1\* 12/2013 Russell, Jr. .......... H04W 4/005
 370/329
2014/0321365 A1\* 10/2014 Shoji ................ H04W 60/06
 370/328
2015/0230166 A1\* 8/2015 Casati ............... H04W 36/12
 370/328

FOREIGN PATENT DOCUMENTS

| CN | 102186162 A | 9/2011 |
| CN | 102595373 A | 7/2012 |
| CN | 102595373 A | 7/2012 |
| WO | WO2013189337 A2 | 12/2013 |

\* cited by examiner

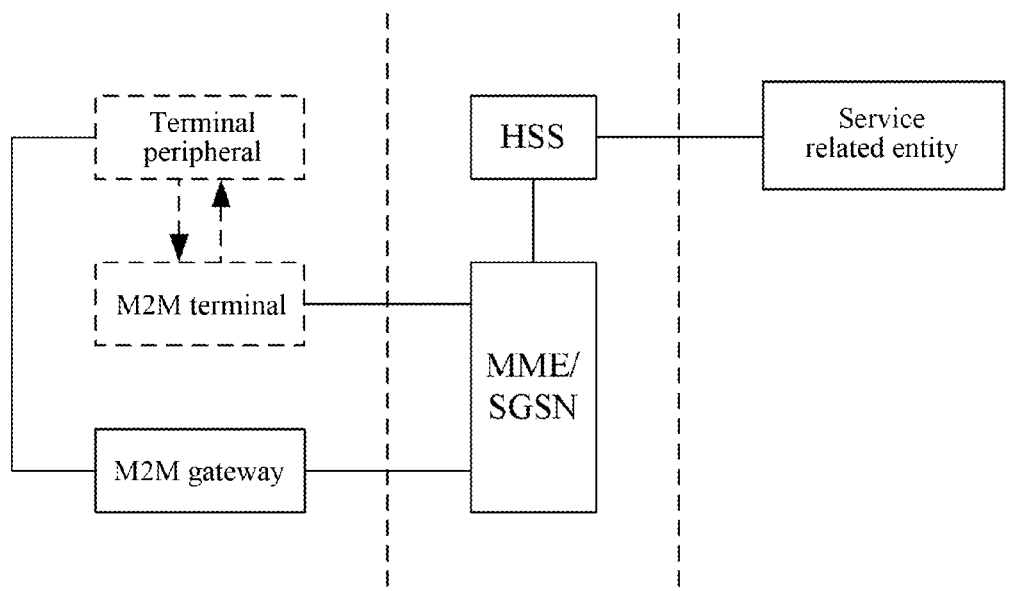

ACCESSIBILITY MANAGEMENT METHOD AND DEVICE FOR M2M TERMINAL/TERMINAL PERIPHERAL

TECHNICAL FIELD

The present document relates to Machine-to-Machine/Man (M2M) communications, and particularly, to a reachability management method and device for an M2M terminal/terminal peripheral.

BACKGROUND

The M2M system architecture is divided into an M2M application layer, an M2M service ability layer, a communication network layer, an M2M terminal and perception extension layer and a management support system.

According to the abilities of the M2M terminal devices, the M2M terminal and perception extension layer divides the M2M terminal devices into two kinds: one is an M2M terminal having an ability to communicate with an M2M communication network, the M2M terminal may directly access an M2M service platform through the communication network, may interact with the platform to accomplish registration, identification and authentication of the terminal, may provide perception information required by the application to perform service interaction with the application through the M2M service platform, and may receive the management to the terminal peripheral; and the other one having an M2M gateway communicating with the M2M communication network and an M2M stub network, besides connecting the M2M stub network to the M2M communication network, the M2M gateway may also receive information of an M2M stub network node, and perform protocol conversion between the M2M stub network and the M2M communication network. The terminal peripheral may perform only short-distance communications due to limitations of itself, a single terminal of such type is called as the terminal peripheral, and a network composed of multiple terminal nodes of such type is called the M2M stub network.

A Mobility Management Entity (MME) or an SGSN is an entity in charge of managing access control, location information update and handover of the terminal device in the M2M communication network, and it is responsible for non-access layer signalling control from the network to the terminal device, and a function of registering the terminal device to the network.

A Home Subscriber Server (HSS) or a Home subscriber Location Register (HLR) is an entity in charge of saving identity information, authentication information and authorization information of the terminal device in the M2M communication network. The HSS or HLR is used for saving identity information of the user and binding information of the user and the terminal device, and it also takes charge of managing a subscription database of the user, and executing identity authentication and authorization of the user. The M2M service platform may query the information of the user or terminal device from the HSS or HLR.

In practical applications, normally a scenario of interconversion between the M2M terminal and the terminal peripheral would occur. For example, when the user connects a terminal node, such as a mobile phone, a tablet computer and a notebook and the like to the communication network via a home gateway or a vehicle-mounted gateway and so on, the terminal node serves as the terminal peripheral to interact with the M2M service platform via the M2M gateway; and when the user leaves the M2M stub network covered by the home gateway and vehicle-mounted gateway and directly connects the terminal node to the communication network, the terminal node serves as the M2M terminal to directly interact with the M2M service platform.

However, in the related art, there has been no effective mechanism for the network performing reachability management to the M2M terminal/terminal peripheral during the interconversion.

SUMMARY

The technical problem required to be solved in the embodiments of the present document is to provide a reachability management method and device for an M2M terminal/terminal peripheral, to solve the reachability management problem of the M2M terminal/terminal peripheral during the interconversion.

In order to solve the above technical problem, the embodiment of the present document discloses a reachability management method for a machine-to-machine/man (M2M) terminal/terminal peripheral, which comprises:

when selecting to switch to an M2M stub network, the M2M terminal/terminal peripheral sending a detach request message to a corresponding network side device, wherein the detach request message comprises a terminal signalling connection retention indication; and meanwhile, the M2M terminal/terminal peripheral sending a registration request message to an M2M gateway, wherein the registration request message contains an identifier of the network side device.

Alternatively, in the above method, the network side device is a mobility management entity (MME) or a serving general packet radio service support node (SGSN).

Alternatively, the above method further comprises:

after receiving the detach request message sent by the M2M terminal/terminal peripheral, the network side device retaining a signalling connection with the M2M terminal/terminal peripheral according to the terminal signalling connection retention indication in the detach request message, and mobility management context information of the M2M terminal/terminal peripheral, and sending a detach accept message to the M2M terminal/terminal peripheral.

Alternatively, the above method further comprises:

after receiving the registration request message sent by the M2M terminal/terminal peripheral, the M2M gateway requesting, after an authentication on the terminal/terminal peripheral is passed, a corresponding network side device for subscription data of the M2M terminal/terminal peripheral through a subscription data request message, wherein the subscription data request message contains an M2M gateway identifier. Alternatively, in the above method, after receiving the subscription data request message sent by the M2M gateway, the network side device searches for subscription data corresponding to the M2M terminal/terminal peripheral according to an M2M terminal/terminal peripheral identifier, and sends the subscription data to the M2M gateway through a context response message; and meanwhile, the network side device stores the M2M gateway identifier in the subscription data request message in locally stored information.

Alternatively, in the above method, after receiving the context response message sent by the network side device, the M2M gateway sends a registration confirmation message to the M2M terminal/terminal peripheral for the M2M terminal/terminal peripheral.

Alternatively, the above method further comprises:

when receiving a terminal reachability notification request message sent by a home subscriber server (HSS) or a home subscriber location register (HLR), the network side device setting a value of a parameter terminal reachability notification request parameter (URRP)-MME or URRP-SGSN as "set" in locally stored terminal mobility management context information, and sending the terminal reachability notification request message to the M2M gateway.

Alternatively, the above method further comprises:

after receiving the terminal reachability notification request message, the M2M gateway setting the parameter URRP-MME or URRP-SGSN in locally stored terminal context information, and setting the value of the parameter URRP-MME or URRP-SGSN as "set".

Alternatively, the above method further comprises:

when detecting that the M2M terminal/terminal peripheral is in activity, the M2M gateway setting the value of the parameter URRP-MME or URRP-SGSN as "not set" in the locally stored terminal context information, and sending a terminal activity notification message to the network side device, wherein, the terminal activity notification message contains a terminal reachable indication.

Alternatively, the above method further comprises:

after receiving the terminal activity notification message sent by the M2M gateway, the network side device setting the value of the parameter URRP-MME or URRP-SGSN as "not set" in the locally stored terminal mobility management context information, and sending the terminal activity notification message to the HSS or HLR.

The embodiment of the present document further discloses a terminal device, which comprises:

a first unit, configured to: when a present terminal selects to switch to a machine-to-machine/man (M2M) stub network, send a detach request message to a mobility management entity (MME) or a serving general packet radio service support node (SGSN), wherein the detach request message comprises a terminal signalling connection retention indication; and a second unit, configured to: while the first unit sends the detach request message, send a registration request message to an M2M gateway, wherein the registration request message contains an MME identifier or an SGSN identifier.

The embodiment of the present document further discloses a network side device, which comprises:

a first unit, configured to: when receiving a detach request message sent by an M2M terminal/terminal peripheral, read whether there is a terminal signalling connection retention indication in the detach request message; and a second unit, configured to: when the first unit reads the terminal signalling connection retention indication, retain a signalling connection with the M2M terminal/terminal peripheral according to the terminal signalling connection retention indication, and mobility management context information of the M2M terminal/terminal peripheral, and send a detach accept message to the M2M terminal/terminal peripheral.

Alternatively, the above device further comprises:

a third unit, configured to: when receiving a subscription data request message sent by an M2M gateway, search for subscription data corresponding to the M2M terminal/terminal peripheral according to an M2M terminal/terminal peripheral identifier, and send the subscription data to the M2M gateway through a context response message; and a fourth unit, configured to: when receiving a subscription data request message sent by the M2M gateway, locally store an M2M gateway identifier in the subscription data request message.

Alternatively, the above device further comprises:

a fifth unit, configured to: when receiving a terminal reachability notification request message sent by a home subscriber server (HSS) or a home subscriber location register (HLR), set a value of a parameter URRP-MME or URRP-SGSN as "set" in locally stored terminal mobility management context information, and send the terminal reachability notification request message to the corresponding M2M gateway.

Alternatively, the above device further comprises:

a sixth unit, configured to: when receiving a terminal activity notification message sent by the M2M gateway, set the value of the parameter URRP-MME or URRP-SGSN as "not set" in the locally stored terminal mobility management context information, and send the terminal activity notification message to the corresponding HSS or HLR.

Alternatively, the above network side device is an MME or an SGSN.

The embodiment of the present document further discloses a machine-to-machine/man (M2M) gateway device, which comprises:

a first unit, configured to: when receiving a registration request message sent by an M2M terminal/terminal peripheral, judge whether the M2M terminal/terminal peripheral is switched to an M2M stub network; and a second unit, configured to: when the M2M terminal/terminal peripheral sending the registration request message is switched to the M2M stub network, after passing an authentication on the terminal/terminal peripheral, request a corresponding mobility management entity (MME) or serving general packet radio service support node (SGSN) for subscription data of the M2M terminal/terminal peripheral through a subscription data request message, wherein the subscription data request message contains an M2M gateway identifier.

Alternatively, the above device further comprises:

a third unit, configured to: when receiving a terminal reachability notification request message, set a parameter terminal reachability notification request parameter (URRP)-MME or URRP-SGSN in locally stored terminal context information, and set a value of the parameter URRP-MME or URRP-SGSN as "set".

Alternatively, the above device further comprises:

a fourth unit, configured to: when detecting that the M2M terminal/terminal peripheral is in activity, set the value of the parameter URRP-MME or URRP-SGSN as "not set" in the locally stored terminal context information, and send a terminal activity notification message to the MME or SGSN, wherein, the terminal activity notification message contains a terminal reachable indication.

With the technical scheme of the present document, the network may implement effective reachability management to the M2M terminal/terminal peripheral through the M2M gateway.

BRIEF DESCRIPTION OF DRAWINGS

FIG. 1 is a schematic diagram of a structure of the system in the embodiment of the present document.

PREFERRED EMBODIMENTS OF THE DOCUMENT

The technical scheme of the embodiments of the present document will be further described in detail in combination with the accompanying drawings below. The embodiments in the present document and the characteristics in the embodiments may be arbitrarily combined with each other in the case of no conflict.

Embodiment 1

The embodiment provides a reachability management method for an M2M terminal/terminal peripheral, which includes the following operations:

when selecting to switch to an M2M stub network, the M2M terminal/terminal peripheral sends a detach request message carrying a terminal signalling connection retention indication to a corresponding network side device; and meanwhile, the M2M terminal/terminal peripheral sends a registration request message to an M2M gateway, and the registration request message contains a network side device identifier.

Wherein, the network side device related in the embodiment may be an MME, and also may be an SGSN.

In the embodiment, generally the M2M terminal/terminal peripheral switches to the M2M stub network from an M2M communication network.

Firstly the MME as the network side device is taken as an example below to describe the process of reachability management provided in the embodiment, and the process includes the following operations:

1. When an M2M terminal node selects to register to an M2M communication network, the M2M terminal node sends an attach request message to a mobility management entity (MME), and the message includes a terminal node identifier such as an International Mobile Subscriber Identity (IMSI), and a security certificate.

2. After passing an authentication on the terminal node identifier and the security certificate, the MME requests a home subscriber server (HSS) for subscription data of the M2M terminal node through a location update request message, and the message contains the terminal node identifier and an MME identifier.

3. After receiving the request of the MME, the HSS searches subscription data corresponding to the M2M terminal node according to the terminal node identifier, and provides the subscription data of the M2M terminal node to the MME through a location update response message.

4. After receiving the subscription data sent by the HSS, the MME sends an attach accept message to the M2M terminal node, and the message contains the terminal node identifier, such as a Global Unique Temporary Identifier (GUTI).

5. When the M2M terminal node selects to switch to an M2M stub network, it sends a detach request message to the MME, and the message includes a terminal node identifier, and a UE-Signalling-Connection-Retention indication; and meanwhile, the M2M terminal node sends a registration request message to an M2M gateway, and the message contains the terminal node identifier and the security certificate, and the MME identifier.

6. After receiving the request of the M2M terminal node, the MME deletes a bearer for the M2M terminal node, but retains a signalling connection with the M2M terminal node, and retains mobility management (MM) context information of the M2M terminal node in the locally stored information, and sends a detach accept message to the M2M terminal node in the meantime.

7. After passing the authentication on the terminal node identifier and the security certificate, the M2M gateway requests the MME for subscription data of the M2M terminal node through a subscription data request message, and the message contains the terminal node identifier, and an M2M gateway identifier, such as a Global Unique Gateway Identifier (GUGI).

8. After receiving the request of the M2M gateway, the MME searches subscription data corresponding to the M2M terminal node according to the terminal node identifier, and provides the subscription data of the M2M terminal node to the M2M gateway through a context response message.

Meanwhile, the MME stores the M2M gateway identifier in the locally stored information. The specific implementation may be to add the identifier in the terminal mobility management context information locally stored by the MME to indicate a one-to-one mapping relation between the terminal node and the M2M gateway.

9. After receiving the subscription data sent by the MME, the M2M gateway allocates a routing to the M2M terminal node, and sends a registration confirmation message to the M2M terminal node.

10. After receiving a terminal reachability indication request of the service related entity, the HSS sets a value of a parameter UE-REACHABILITY-NOTIFICATION-REQUEST (URRP)-MME as "set" in the locally stored terminal subscription data, searches the MME identifier corresponding to the M2M terminal node, and sends a terminal reachability notification request to the MME.

11. After receiving the request of the HSS, the MME sets the value of the parameter URRP-MME as "set" in the locally stored terminal mobility management context information, and sends a terminal reachability notification request message to the M2M gateway.

12. After receiving the request of the MME, the M2M gateway sets the parameter URRP-MME in the locally stored terminal context information, and sets the value of the parameter URRP-MME as "set".

13. When detecting a UE activity, such as if receiving the service request of the terminal node, the M2M gateway sets the value of the parameter URRP-MME as "not set" in the locally stored terminal context information, and sends a UE-Activity-Notification message to the MME. The message contains the terminal node identifier, and a UE-Reachable indication.

14. After receiving the notification of the M2M gateway, the MME sets the value of the parameter URRP-MME as "not set" in the locally stored terminal mobility management context information, and sends a terminal activity notification message to the HSS.

15. After receiving the notification of the MME, the HSS sets the value of the parameter URRP-MME as "not set" in the locally stored terminal subscription data, and notifies the service related entity of that the terminal is reachable.

The SGSN as the network side device is then taken as another example below to describe the process of reachability management to the M2M terminal in the embodiment, and the process includes the following operations:

1. When an M2M terminal node selects to register to an M2M communication network, the M2M terminal node sends an attach request message to a serving GPRS support node (SGSN), and the message includes a terminal node identifier and a security certificate.

2. After passing an authentication on the terminal node identifier and the security certificate, the SGSN requests an HSS for subscription data of the M2M terminal node through a location update request message, and the message contains the terminal node identifier and an SGSN number and address.

3. After receiving the request of the SGSN, an HLR searches for subscription data corresponding to the M2M terminal node according to the terminal node identifier, and provides the subscription data of the M2M terminal node to the SGSN through a location update response message.

4. After receiving the subscription data sent by the HLR, the SGSN sends an attach accept message to the M2M terminal node, and the message contains the terminal node identifier, such as a Packet-Temporary Mobile Subscriber Identifier (P-TMSI).

5. When the M2M terminal node selects to switch to an M2M stub network, the M2M terminal node sends a detach request message to the SGSN, and the message includes a terminal node identifier, and a UE-Signalling-Connection-Retention indication; and meanwhile, the M2M terminal node sends a registration request message to an M2M gateway, and the message contains the terminal node identifier and the security certificate, and the SGSN number and address.

6. After receiving the request of the M2M terminal node, the SGSN deletes a bearer for the M2M terminal node, but retains a signalling connection with the M2M terminal node, and retains mobility management (MM) context information of the M2M terminal node in the locally stored information, and sends a detach accept message to the M2M terminal node in the meantime.

7. After passing the authentication on the terminal node identifier and the security certificate, the M2M gateway requests the SGSN for subscription data of the M2M terminal node through a subscription data request message, and the message contains the terminal node identifier, and an M2M gateway identifier.

8. After receiving the request of the M2M gateway, the SGSN searches for subscription data corresponding to the M2M terminal node according to the terminal node identifier, and provides the subscription data of the M2M terminal node to the M2M gateway through a context response message.

Meanwhile, the SGSN stores the M2M gateway identifier in the locally stored information. The specific implementation may be to add the identifier in the terminal mobility management context information locally stored by the SGSN to indicate a one-to-one mapping relation between the terminal node and the M2M gateway.

9. After receiving the subscription data sent by the SGSN, the M2M gateway allocates a routing to the M2M terminal node, and sends a registration confirmation message to the M2M terminal node.

10. After receiving a terminal reachability indication request of the service related entity, the HLR sets a value of a parameter URRP-SGSN as "set" in the locally stored terminal subscription data, searches the SGSN number and address corresponding to the M2M terminal node, and sends a terminal reachability notification request to the SGSN.

11. After receiving the request of the HLR, the SGSN sets the value of the parameter URRP-SGSN as "set" in the locally stored terminal mobility management context information, and sends a terminal reachability notification request message to the M2M gateway.

12. After receiving the request of the SGSN, the M2M gateway sets the parameter URRP-SGSN in the locally stored terminal context information, and sets the value of the parameter URRP-SGSN as "set".

13. When detecting a UE activity, such as if receiving the service request of the terminal node, the M2M gateway sets the value of the parameter URRP-SGSN as "not set" in the locally stored terminal context information, and sends a UE-Activity-Notification message to the SGSN. The message contains the terminal node identifier, and a UE-Reachable indication.

14. After receiving the notification of the M2M gateway, the SGSN sets the value of the parameter URRP-SGSN as "not set" in the locally stored terminal mobility management context information, and sends a terminal activity notification message to the HLR.

15. After receiving the notification of the SGSN, the HLR sets the value of the parameter URRP-SGSN as "not set" in the locally stored terminal subscription data, and notifies the service related entity of that the terminal is reachable.

Embodiment 2

The embodiment firstly provides a reachability management system for the M2M terminal/terminal peripheral, and the system architecture is as shown in FIG. 1, which includes a terminal node that can be switched to the M2M terminal or the terminal peripheral, an M2M gateway device, a network side device (an MME or an SGSN) and an HSS or an HLR.

Wherein, the terminal device that can be switched to the M2M terminal or the terminal peripheral provided in the embodiment at least includes:

a first unit, configured to: when a present terminal selects to switch to an M2M stub network, send a detach request message to an MME or an SGSN, wherein the detach request message includes a terminal signalling connection retain indication;

wherein, generally the M2M terminal/terminal peripheral switches to the M2M stub network from an M2M communication network;

a second unit, configured to: while the first unit sends the detach request message, send a registration request message to an M2M gateway, wherein the registration request message contains an MME identifier or an SGSN identifier.

The network side device provided in the embodiment may be an MME or an SGSN, and it at least includes:

a first unit, configured to: when receiving a detach request message sent by an M2M terminal/terminal peripheral, read whether there is a terminal signalling connection retain indication in the detach request message; and a second unit, configured to: when the first unit reads the terminal signalling connection retain indication, retain a signalling connection with the M2M terminal/terminal peripheral according to the terminal signalling connection retain indication, and mobility management context information of the M2M terminal/terminal peripheral, and send a detach accept message to the M2M terminal/terminal peripheral.

Based on the above structure, the network side device may also include:

a third unit, configured to: when receiving a subscription data request message sent by an M2M gateway, search for subscription data corresponding to the M2M terminal/terminal peripheral according to an M2M terminal/terminal peripheral identifier, and send the subscription data to the M2M gateway through a context response message; and a fourth unit, configured to: when receiving a subscription data request message sent by the M2M gateway, locally store an M2M gateway identifier in the subscription data request message.

It may also include: a fifth unit, configured to: when receiving a terminal reachability notification request message sent by an HSS or an HLR, set a value of a parameter URRP-MME or URRP-SGSN as "set" in locally stored terminal mobility management context information, and send the terminal reachability notification request message to the corresponding M2M gateway.

It may also include: a sixth unit, configured to: when receiving a terminal activity notification message sent by the M2M gateway, set the value of the parameter URRP-MME or URRP-SGSN as "not set" in the locally stored terminal mobility management context information, and send the terminal activity notification message to the corresponding HSS or HLR.

The M2M gateway device provided in the embodiment at least includes:

a first unit, configured to: when receiving a registration request message sent by an M2M terminal/terminal peripheral, judge whether the M2M terminal/terminal peripheral switched to an M2M stub network; and a second unit, configured to: when the M2M terminal/terminal peripheral sending the registration request message switched to the M2M stub network, after passing an authentication on the terminal/terminal peripheral identifier and the security certificate, request a corresponding MME or SGSN for subscription data of the M2M terminal/terminal peripheral through a subscription data request message, wherein the subscription data request message contains an M2M gateway identifier.

In addition, the above M2M gateway device may also include: a third unit, configured to: when receiving a terminal reachability notification request message, set a parameter URRP-MME or URRP-SGSN in locally stored terminal context information, and set a value of the parameter URRP-MME or URRP-SGSN as "set".

It may also include: a fourth unit, configured to: when detecting that the M2M terminal/terminal peripheral is in activity, set the value of the parameter URRP-MME or URRP-SGSN as "not set" in the locally stored terminal context information, and send a terminal activity notification message to the MME or SGSN, wherein, the terminal activity notification message contains a terminal reachable indication.

All or part of the steps in the above method may be completed by a program instructing related hardware, and the program may be stored in a computer readable memory medium, such as a read-only memory, magnetic disk or optical disk and so on. Alternatively, all or part of the steps of the above examples also may be implemented by using one or multiple integrated circuits. Correspondingly, each module/unit in the above examples may be implemented in a form of hardware, and also may be implemented in a form of software function module. The present document is not limited to any combination of hardware and software in a specific form.

The above description is only the preferred examples of the present document, which is not used to limit the protection scope of the embodiments of the present document. All the modifications, equivalent substitutions, and improvements, etc. made within the spirit and principle of the embodiments of the present document shall fall into the protection scope of the embodiments of the present document.

INDUSTRIAL APPLICABILITY

With the technical scheme of the present document, the network may implement effective reachability management to the M2M terminal/terminal peripheral through the M2M gateway.

What is claimed is:

1. A reachability management method for a machine-to-machine/man (M2M) terminal/terminal peripheral, comprising:
    when selecting to switch to an M2M stub network, the M2M terminal/terminal peripheral sending a detach request message to a corresponding network side device, wherein the detach request message comprises a terminal signalling connection retention indication; and
    meanwhile, the M2M terminal/terminal peripheral sending a registration request message to an M2M gateway, wherein the registration request message contains an identifier of the network side device.

2. The method of claim 1, wherein,
    the network side device is a mobility management entity (MME) or a serving general packet radio service support node (SGSN).

3. The method of claim 2, further comprising:
    after receiving the detach request message sent by the M2M terminal/terminal peripheral, the network side device retaining a signalling connection with the M2M terminal/terminal peripheral according to the terminal signalling connection retention indication in the detach request message, and mobility management context information of the M2M terminal/terminal peripheral, and sending a detach accept message to the M2M terminal/terminal peripheral.

4. The method of claim 3, further comprising:
    after receiving the registration request message sent by the M2M terminal/terminal peripheral, the M2M gateway requesting, after an authentication on the terminal/terminal peripheral is passed, a corresponding network side device for subscription data of the M2M terminal/terminal peripheral through a subscription data request message, wherein the subscription data request message contains an M2M gateway identifier.

5. The method of claim 4, wherein,
    after receiving the subscription data request message sent by the M2M gateway, the network side device searches for subscription data corresponding to the M2M terminal/terminal peripheral according to an M2M terminal/terminal peripheral identifier, and sends the subscription data to the M2M gateway through a context response message; and
    meanwhile, the network side device stores the M2M gateway identifier in the subscription data request message in locally stored information.

6. The method of claim 5, wherein,
    after receiving the context response message sent by the network side device, the M2M gateway sends a registration confirmation message to the M2M terminal/terminal peripheral for the M2M terminal/terminal peripheral.

7. The method of claim 6, further comprising:
    when receiving a terminal reachability notification request message sent by a home subscriber server (HSS) or a home subscriber location register (HLR), the network side device setting a value of a parameter terminal reachability notification request parameter (URRP)-MME or URRP-SGSN as "set" in locally stored terminal mobility management context information, and sending the terminal reachability notification request message to the M2M gateway.

8. The method of claim 7, further comprising:
    after receiving the terminal reachability notification request message, the M2M gateway setting the parameter URRP-MME or URRP-SGSN in locally stored terminal context information, and setting the value of the parameter URRP-MME or URRP-SGSN as "set".

9. The method of claim 8, further comprising:
when detecting that the M2M terminal/terminal peripheral is in activity, the M2M gateway setting the value of the parameter URRP-MME or URRP-SGSN as "not set" in the locally stored terminal context information, and sending a terminal activity notification message to the network side device, wherein, the terminal activity notification message contains a terminal reachable indication.

10. The method of claim 9, further comprising:
after receiving the terminal activity notification message sent by the M2M gateway, the network side device setting the value of the parameter URRP-MME or URRP-SGSN as "not set" in the locally stored terminal mobility management context information, and sending the terminal activity notification message to the HSS or HLR.

11. A terminal device, comprising:
a first unit, configured to: when a present terminal selects to switch to a machine-to-machine/man (M2M) stub network, send a detach request message to a mobility management entity (MME) or a serving general packet radio service support node (SGSN), wherein the detach request message comprises a terminal signalling connection retention indication; and
a second unit, configured to: while the first unit sends the detach request message, send a registration request message to an M2M gateway, wherein the registration request message contains an MME identifier or an SGSN identifier.

12. A machine-to-machine/man (M2M) gateway device, comprising:
a first unit, configured to: when receiving a registration request message sent by an M2M terminal/terminal peripheral, judge whether the M2M terminal/terminal peripheral switched to an M2M stub network; and
a second unit, configured to: when the M2M terminal/terminal peripheral sending the registration request message switched to the M2M stub network, after an authentication on the terminal/terminal peripheral is passed, request a corresponding mobility management entity (MME) or serving general packet radio service support node (SGSN) for subscription data of the M2M terminal/terminal peripheral through a subscription data request message, wherein the subscription data request message contains an M2M gateway identifier.

13. The device of claim 12, further comprising:
a third unit, configured to: when receiving a terminal reachability notification request message, set a parameter terminal reachability notification request parameter (URRP)-MME or URRP-SGSN in locally stored terminal context information, and set a value of the parameter URRP-MME or URRP-SGSN as "set".

14. The device of claim 13, further comprising:
a fourth unit, configured to: when detecting that the M2M terminal/terminal peripheral is in activity, set the value of the parameter URRP-MME or URRP-SGSN as "not set" in the locally stored terminal context information, and send a terminal activity notification message to the MME or SGSN, wherein, the terminal activity notification message contains a terminal reachable indication.

* * * * *